United States Patent
Hashimoto

(10) Patent No.: US 7,339,759 B2
(45) Date of Patent: Mar. 4, 2008

(54) RECORDING MEDIUM CARTRIDGE AND RECORDING/REPRODUCING APPARATUS THEREFOR

(75) Inventor: Akihiro Hashimoto, Kanagawa (JP)

(73) Assignee: FUJIFLIM Corporation, Tokyo (JP)

( * ) Notice: Subject to any disclaimer, the term of this patent is extended or adjusted under 35 U.S.C. 154(b) by 174 days.

(21) Appl. No.: 10/647,447

(22) Filed: Aug. 26, 2003

(65) Prior Publication Data

US 2004/0120066 A1 Jun. 24, 2004

(30) Foreign Application Priority Data

Aug. 27, 2002 (JP) .............................. 2002-247296

(51) Int. Cl.
G11B 27/36 (2006.01)
G06F 11/30 (2006.01)
G06F 12/14 (2006.01)
H03M 13/00 (2006.01)

(52) U.S. Cl. .......................... 360/31; 713/193; 714/758
(58) Field of Classification Search .................. 360/31; 714/758
See application file for complete search history.

(56) References Cited

U.S. PATENT DOCUMENTS 6,467,060 B1 * 10/2002 Malakapalli et al. ....... 714/758
6,674,596 B1 1/2004 Takayama
2002/0035695 A1 * 3/2002 Riches et al. ............... 713/193

FOREIGN PATENT DOCUMENTS

| JP | 10-283265 A | 10/1998 |
|---|---|---|
| JP | 2001-52422 A | 2/2001 |
| JP | 2001-332064 A | 11/2001 |

* cited by examiner

*Primary Examiner*—William Korzuch
*Assistant Examiner*—Daniell L. Negrón
(74) *Attorney, Agent, or Firm*—Sughrue Mion, PLLC

(57) ABSTRACT

A recording medium cartridge with a recording medium and cartridge memory records a first CRC code produced from data of the recording medium in the cartridge memory in an unrewritable state. A recording/reproducing apparatus for recording/reproducing the recording medium cartridge is provided with a CRC code producing means, CRC code recording means, CRC code comparing means, and authentication determining means. The comparing means compares a fourth CRC code produced from data recorded in the recording medium with the first CRC code corresponding to the data recorded in the cartridge memory. The authentication determining means determines authentication of the data recorded in the recording medium based on a comparison result of the comparing means.

2 Claims, 5 Drawing Sheets

RECORDING MEDIUM CARTRIDGE AND RECORDING/REPRODUCING APPARATUS THEREFOR

FIELD OF THE INVENTION

The present invention relates to a recording medium cartridge and a recording/reproducing apparatus therefor provided with a cartridge memory (non-contact cartridge memory).

BACKGROUND OF THE INVENTION

Conventionally, a magnetic tape cartridge (recording medium cartridge) is provided with a cartridge memory other than a magnetic tape, which is a recording medium, for recording information such as a manufacturing number and usage history unique to the magnetic tape cartridge. Because such the cartridge memory can send/receive electric power and signals with no contact, it is housed in a cartridge case of the magnetic tape cartridge (for example, see page 2 and FIGS. 7 and 8 in Japan patent laid open publication 2001-332064).

Meantime, because a conventional magnetic tape cartridge is set so that recording/reproducing and modifying data can be repeated, so it is difficult to simply verify data authentication (whether or not the data is tampered). Especially, in fields of medical care, law, and the like, assuring data authentication recorded in a magnetic tape cartridge is required, so it is needed to simply assure the data authentication.

SUMMARY OF THE INVENTION

An exemplary object of the present invention is to provide a recording medium cartridge and recording/reproducing apparatus therefor which can verify data authentication.

According to a first aspect of the invention, the recording medium cartridge of the invention solving the conventional problem is provided with a recording medium and cartridge memory, and a CRC code produced from data recorded in a recording medium is recorded in a cartridge memory in an unrewritable state.

Because a CRC code of data which is not wanted be tampered is recorded in a cartridge memory in an unrewritable state, so it is known whether the CRC code is tampered or not only by comparing it with a CRC code of data recorded in a recording medium. To be more precise, for example, in reproducing the recording medium cartridge, the recording/reproducing apparatus reads a CRC code recorded in the recording medium, and also reads one recorded in the cartridge memory. Then, these CRC codes are compared, and if both accords, the data is not tampered and if both do not accord, the data is tampered.

According to a second aspect of the invention, the recording medium cartridge is provided with a recording medium and cartridge memory, and a CRC code produced based on an address of data is recorded in the cartridge memory in an unrewritable state.

Accordingly, in reproducing the recording medium cartridge, the recording/reproducing apparatus reads a serial number recorded in a CRC code and a LPOS as its address, thereby producing a CRC code from these. Then, the produced CRC code is compared with a CRC code read from the cartridge memory, and if both accord, the data is not tampered and if both do not accord, the data is tampered.

According to a third aspect of the invention, the recording medium cartridge is provided with a recording medium and a cartridge memory, and a CRC code, which is produced based on a serial number of the cartridge memory and a CRC code which is produced from data recorded in the recording medium, is recorded in the cartridge memory in an unrewritable state.

For example, in reproducing the recording medium cartridge, the recording/reproducing apparatus reads a CRC code recorded in the recording medium and the serial number recorded in the cartridge memory and produces a CRC code from these. Then, comparing the produced CRC code with one read from the cartridge memory, if both accord, the data is not tampered, and if both do not accord, it is tampered.

PREFERRED EMBODIMENT OF THE INVENTION a. First Embodiment

Hereinafter, with reference to the drawings, details of a recording medium cartridge related to the invention and recording/reproducing apparatus therefor will be described. Meanwhile, in the embodiments, a magnetic tape cartridge will be described as an example of the recording medium cartridge.

Figure 1:
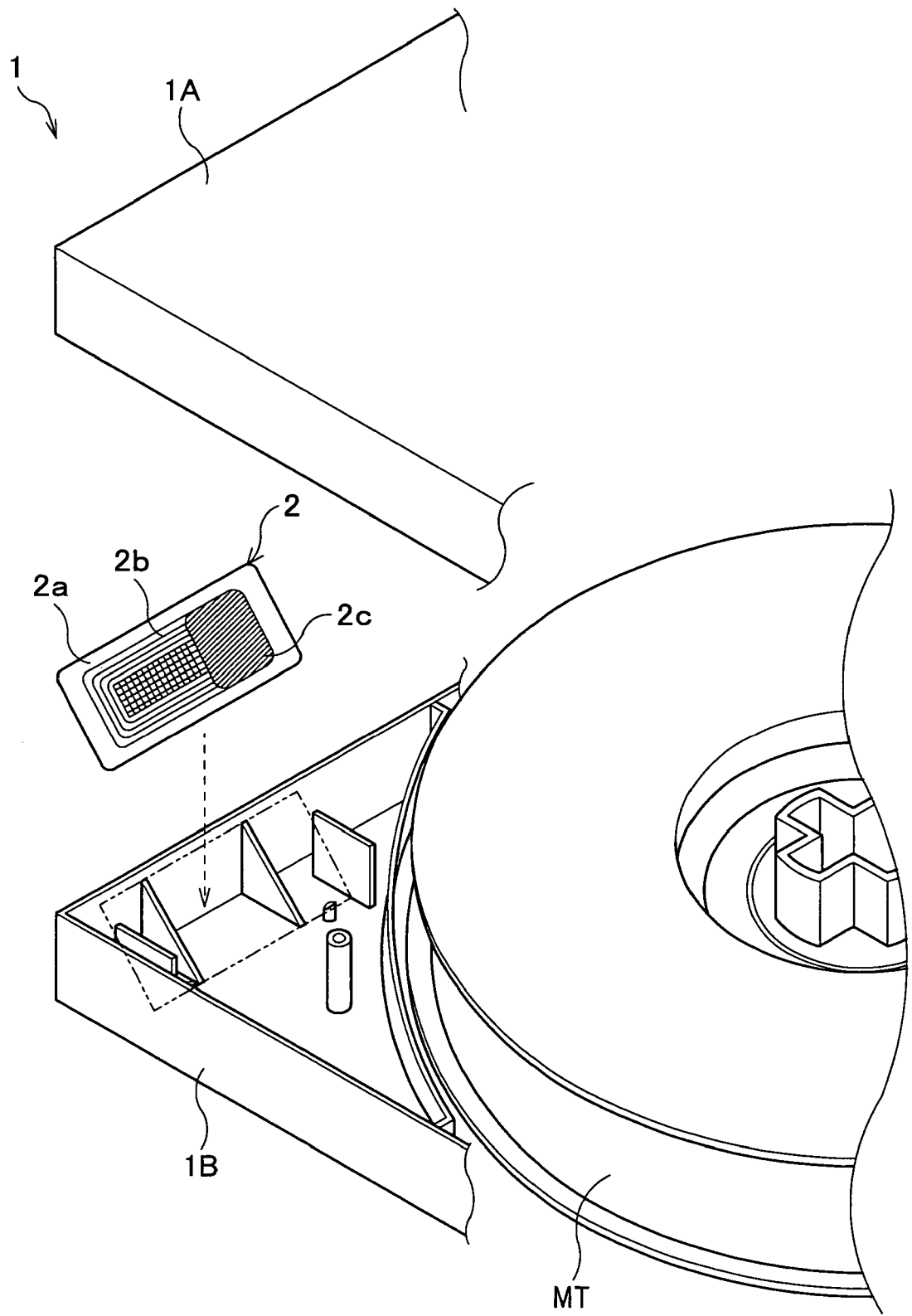
FIG. 1 is an enlarged main part view showing a structure of a magnetic tape cartridge related to the invention.

As shown in FIG. 1, a magnetic tape cartridge (recording medium cartridge) 1 is divided into an upper half 1A and lower half 1B and its inside is mainly provided with a magnetic tape (recording medium) MT for recording data and a cartridge memory 2. The memory 2 is a rectangular sheet form electronic component as a whole, its main body is an IC chip (not shown in the drawings) sealed in a globe top 2c which is a sealant made of resin, and the IC chip is wired on a loop antenna 2b printed on a board 2a.

Figure 2:
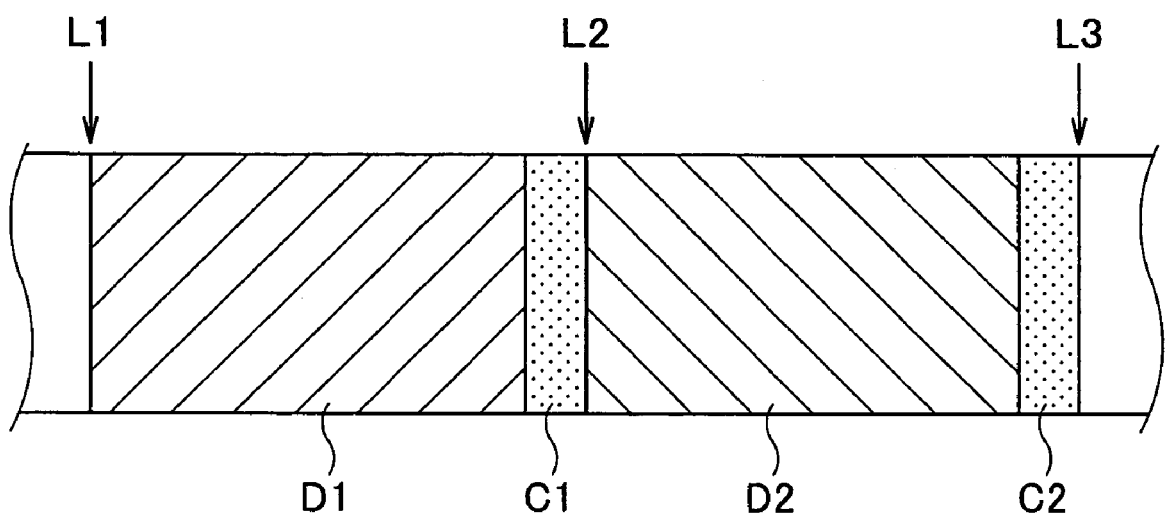
FIG. 2 is a schematic view showing a data configuration recorded in a magnetic tape of FIG. 1.

As shown in FIG. 2, data D1, D2, . . . , Dn (n; an integer larger than 2) are recorded in the magnetic tape MT. A CRC (Cyclic Redundancy Checking) code C1 based on content is recorded adjacent to the data D1. When the data D1 and CRC code C1 are recorded in the magnetic tape MT, a start position L1 and end position L2 which are LPOS (Longitudinal Position of Signal) representing the positions of these both ends are decided. Other data D2, . . . , Dn have an approximately same structure as the data D1. Meanwhile, the embodiment to verify authentication of only the data D1 among the data D1, D2, . . . ,Dn is described below.

Here, the "CRC code" is so-called Cyclic Redundancy Checking code, which means a remainder when dividing data by a specific constant (CRC producing polynomial). To be more precise, in the embodiment, the data D1 is divided into some; one of the divided data is divided by the CRC producing polynomial to obtain a remainder; next data to which a resultant remainder is added is again divided by the polynominal, thus sequentially repeating the procedure; and an eventual remainder becomes the CRC code C1. For example, when the data D1 recorded in the magnetic tape MT is "01 02 03 04 05 06 07 08 09 0A 0B 0C 0D 0E 0F" and is divided by the specific constant, the CRC code C1 produced becomes "E7 36 64 5C." Moreover, "LPOS" is a signal calculated based on a servo signal generally written along a longitudinal direction of the magnetic tape MT and represents a position in the longitudinal direction of the data D1 in the magnetic tape MT. Furthermore, tampering of the data D1 is performed so that new data can further be added, so the LOPS is designed to be surely changed in its value if the Data D1 is tampered.

Figure 3:
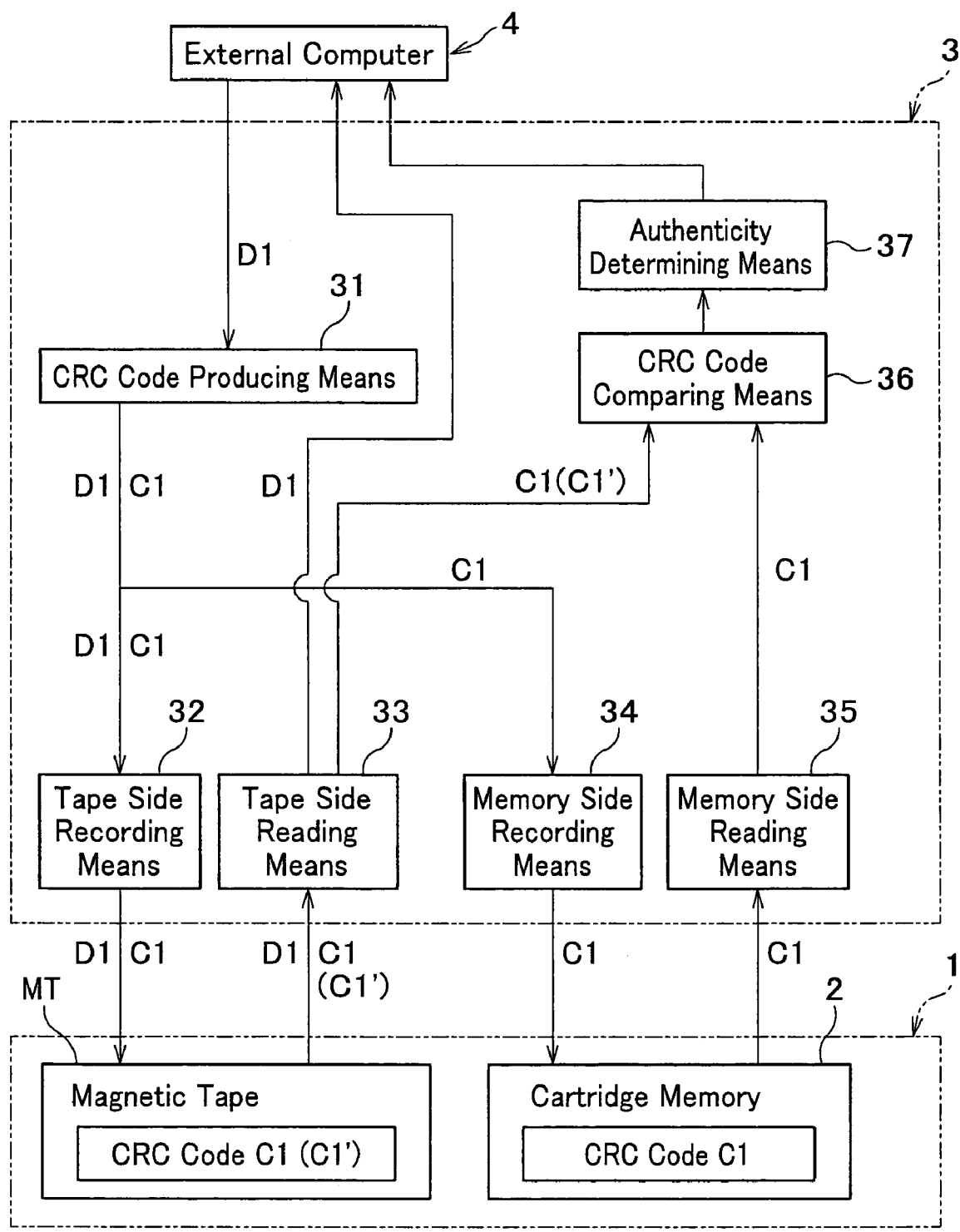
FIG. 3 is a block diagram schematically showing a magnetic tape cartridge related to a first embodiment and recording/reproducing apparatus therefor.

As shown in FIG. 3, a recording/reproducing apparatus 3 is mainly provided with a CRC code producing means 31, a tape side recording means 32 and tape side reading means 33 for recording/reproducing in the magnetic tape MT, a memory side recording means 34 and memory side reading means 35 for recording/reproducing into the cartridge memory 2 (CRC code recording means). In addition, the apparatus 3 is provided with a CRC code comparing means 36 which compares the CRC code C1 recorded in the magnetic tape MT with one recorded in the cartridge memory 2, and an authentication determining means 37 which determines the authentication of the data D1 recorded in the magnetic tape MT based on a comparison result of the CRC code comparing means 36. Moreover, the apparatus 3 is connected with an external computer 4, in which the data D1, D2, . . . ,Dn for recording in the magnetic tape cartridge 1 are input from outside and which makes the outside recognize a result based on a output signal from the authentication determining means 37.

The CRC code producing means 31 produces the CRC code C1 from the data D1 input from the external computer 4. The tape side recording means 32 records the CRC code C1 produced by the CRC code producing means 31 in the magnetic tape MT together with the data D1. The tape side reading means 33 reads the data D1 recorded in the magnetic tape MT together with the code C1, outputs only the code C1 of these two to the CRC code comparing means 36, and outputs other data D1 and the like to the computer 4.

The memory side recording means 34 records the CRC code C1 produced by the CRC code producing means 31 in the cartridge memory 2 and then, write-protects the code C1 to make itself an unrewritable state. The memory side reading means 35 reads the code C1 recorded in the cartridge memory 2 and outputs it to the CRC code comparing means 36.

The comparing means 36 compares the code C1 output from the tape side reading means 33 with the code C1 output from the memory side reading means 35 and outputs a comparison signal, which shows whether or not these accord, to the authentication determining means 37. If the comparison signal from the comparing means 36 shows accordance, the determining means 37 outputs a signal showing that the data D1 is not tampered to the computer 4. On the other hand, if the comparison signal does not show accordance, the determining means 37 outputs a signal showing that the data D1 is tampered to the computer 4.

Then, operations of the recording/reproducing apparatus 3 are described.

Firstly, if an empty magnetic tape cartridge 1 is set in the apparatus 3 in recording and the data D1, D2, . . . Dn are input sequentially from the computer 4, CRC codes C1, C2, . . . , Cn (n; an integer larger than 2) are produced by the CRC code producing means 31 from the data D1, D2, . . . , Dn. The data D1, D2, . . . , Dn, and codes C1, C2, , . . . , Cn are recorded sequentially in the magnetic recording tape MT by the tape side recording means 32, and the code C1 is recorded in the cartridge memory 2 by the memory side recording means 34. A flag of write-protection is on by the memory side recording means 34 after a completion of recording, whereby the code C1 recorded in the cartridge memory 2 becomes an unrewritable state.

In reproducing, the data D1 and CRC code C1 are read from the magnetic tape MT by the tape side reading means 33, and from two, only the code C1 is output to the CRC code comparing means 36. Moreover, the code C1 is read from the cartridge memory 2 by the memory side reading means 35 and output to the CRC code comparing means 36. Then, the code C1 of the data D1 are compared with the code C1 recorded in the cartridge memory 2 by the comparing means 36, and a determined result based on a comparison result is output to the computer 4 by the authentication determining means 37.

Here, when the data D1 is tampered, a CRC code C1' produced based on the tampered data D1 differs from a value before tampered. Therefore, it is confirmed by the CRC code comparing means 36 and authentication determining means 37 that the CRC code C1' after tampered and the CRC code C1 of the cartridge memory 2 do not accord, thereby being able to know that the data D1 is tampered.

According to the above, the following effects can be obtained in the first embodiment.

Only by reproducing the magnetic tape cartridge 1 with the recording/reproducing apparatus 3, the CRC code C1 recorded in the cartridge memory 2 in an unrewritable state is compared with the code C1 of the data D1 recorded in the magnetic tape MT, thereby being able to confirm whether or not the data D1 recorded in the magnetic tape MT has been tampered. Thus, the data authentication can be simply verified.

b. Second Embodiment

Below, a second embodiment of a recording medium cartridge and recording/reproducing apparatus therefor related to the invention is described. Because CRC codes of the embodiment are changed ones of the CRC codes of the first embodiment recorded in the cartridge memory 2, same signs are appended for similar components to the first embodiment and explanations thereof are omitted.

Figure 4:
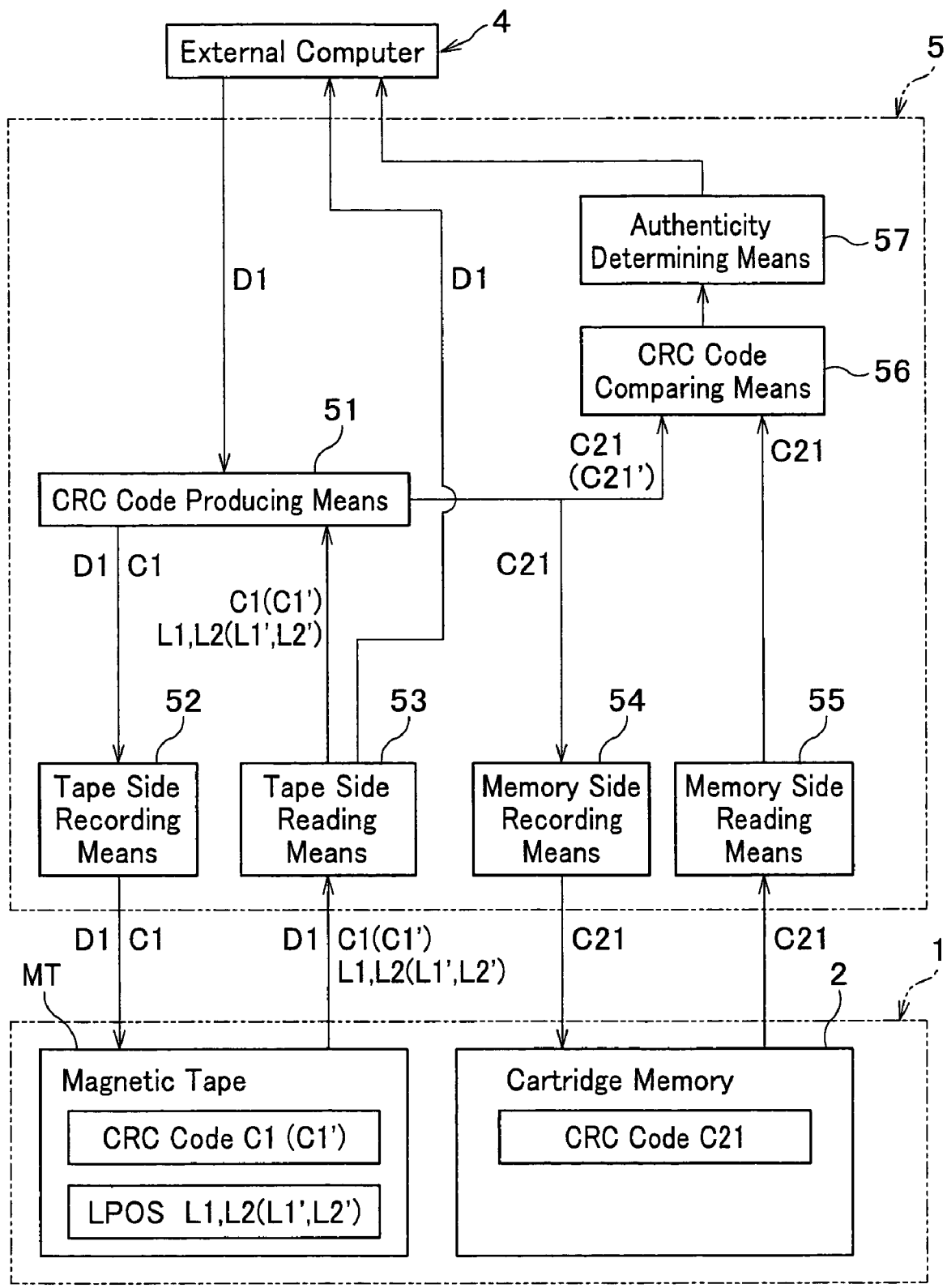
FIG. 4 is a block diagram schematically showing a magnetic tape cartridge related to a second embodiment and recording/reproducing apparatus therefor.

As shown in FIG. 4, a CRC code C1 of a data D1 recorded in the magnetic tape MT and a CRC code C21 produced based on the LPOS (a start portion L1 and end portion L2) of the data D1 are recorded in the cartridge memory 2 in an unrewritable state. Moreover, a recording/reproducing apparatus 5 is provided with a tape side recording means 52, a memory side recording means 54, a memory side reading means 55, a CRC code comparing means 56, and an authentication determining means 57 having approximately similar function to the first embodiment, and is also provided with a CRC code producing means 51 having somewhat a different function from the first embodiment and a tape side reading means 53.

The CRC code producing means 51 produces the CRC code C1 from the data D1 similarly to the first embodiment, and produces the CRC code C21 for recording in the cartridge memory 2 based on the code C1 and LPOS (L1 and L2) which are output from the tape side reading means 53. In addition, in reproducing the magnetic tape cartridge 1, the CRC code producing means 51 produces the code C21 to output to the CRC code comparing means 56 based on the code C1 and LPOS (L1 and L2) output from the tape side reading means 53. For example, when the code C1 of the data D1 is "E7 36 64 5C," the start portion L1 of the LPOS is "00 00 00 01," and the end portion L2 is "00 00 00 02," the code C21 is produced based on "E7 36 64 5C 00 00 00 01 00 00 00 02," whereby a value of the code C21 results in "C9 84 75 36."

The code C21 produced by the CRC code producing means 51 is designed to be output to the memory side recording means 54 in recording the data D1 into the magnetic tape MT, and to be output to the CRC code comparing means 56 in reproducing. The tape side reading means 53 reads the data D1 recorded in the magnetic tape MT together with the code C1 and the LPOS (L1 and L2), and among these, the code C1 and LPOS (L1 and L2) are output to the CRC code producing means 51.

Then, operations of the recording/reproducing apparatus 5 are described.

Firstly, in recording, the data D1 and D2 input from the computer 4 similarly to the first embodiment, the CRC codes C1, C2, . . . , Cn of the data D1, D2, . . . , Dn are produced by the CRC code producing means 51, and these are recorded in the magnetic tape MT by the tape side recording means 52. Then, the code C1 is read from the magnetic tape MT and the LPOS (L1 and L2) of the data D1 is read by the tape side reading means 53, thereby these being output to the CRC code producing means 51. In the producing means 51, the code C21 is produced based on the code C1 and LPOS (L1 and L2). The code C21 is recorded in the cartridge memory 2 in an unrewritable state through the memory side recording means 54.

In reproducing, the CRC code C1 and LPOS (L1 and L2) of the data D1 are read from the magnetic tape MT by the tape side reading means 53 and these are output to the CRC code producing means 51. In the producing means 51, the code C21 is produced based on the code C1 and LPOS (L1 and L2) and is output to the CRC code comparing means 56. On the other hand, the code C21 is read from the cartridge memory 2 by the memory side reading means 55 and is output to the comparing means 56. The code C21 from the CRC code producing means 51 is compared with the code C21 from the cartridge memory 2 by the comparing means 56, a determined result based on a comparison result is output to the computer 4 by the authentication determining means 57.

Here, if the data D1 is tampered, the CRC code C1' and LPOS (L1' and L2') produced based on the tampered data D1 become different from values before tampered. Therefore, it is surely confirmed by the CRC code comparing means 56 and authentication determining means 57 that the CRC code C21'after tampered and the CRC code C21 from the cartridge memory 2 do not accord, thereby being able to surely know that the data D1 has been tampered.

According to the above, the following effects can be obtained in the second embodiment.

Because the LPOS (L1 and L2) which is one of basic data for producing the CRC code C21 recorded in the cartridge memory 2 surely changes in case that the data D1 is tampered, a difference between the tampered data D1 and the CRC code C21'produced from the LPOS (L1' and L2'), and CRC code C21 recorded in the cartridge memory 2 becomes clearer, whereby a reliability of the authentication can be raised higher.

c. Third Embodiment

Below, a third embodiment of a recording medium cartridge related to the invention and recording/reproducing apparatus therefor is described. Because CRC codes of the embodiment are changed ones of the CRC codes of the first embodiment recorded in the cartridge memory 2, same signs are appended for similar components to the first embodiment and explanations thereof are omitted.

Figure 5:
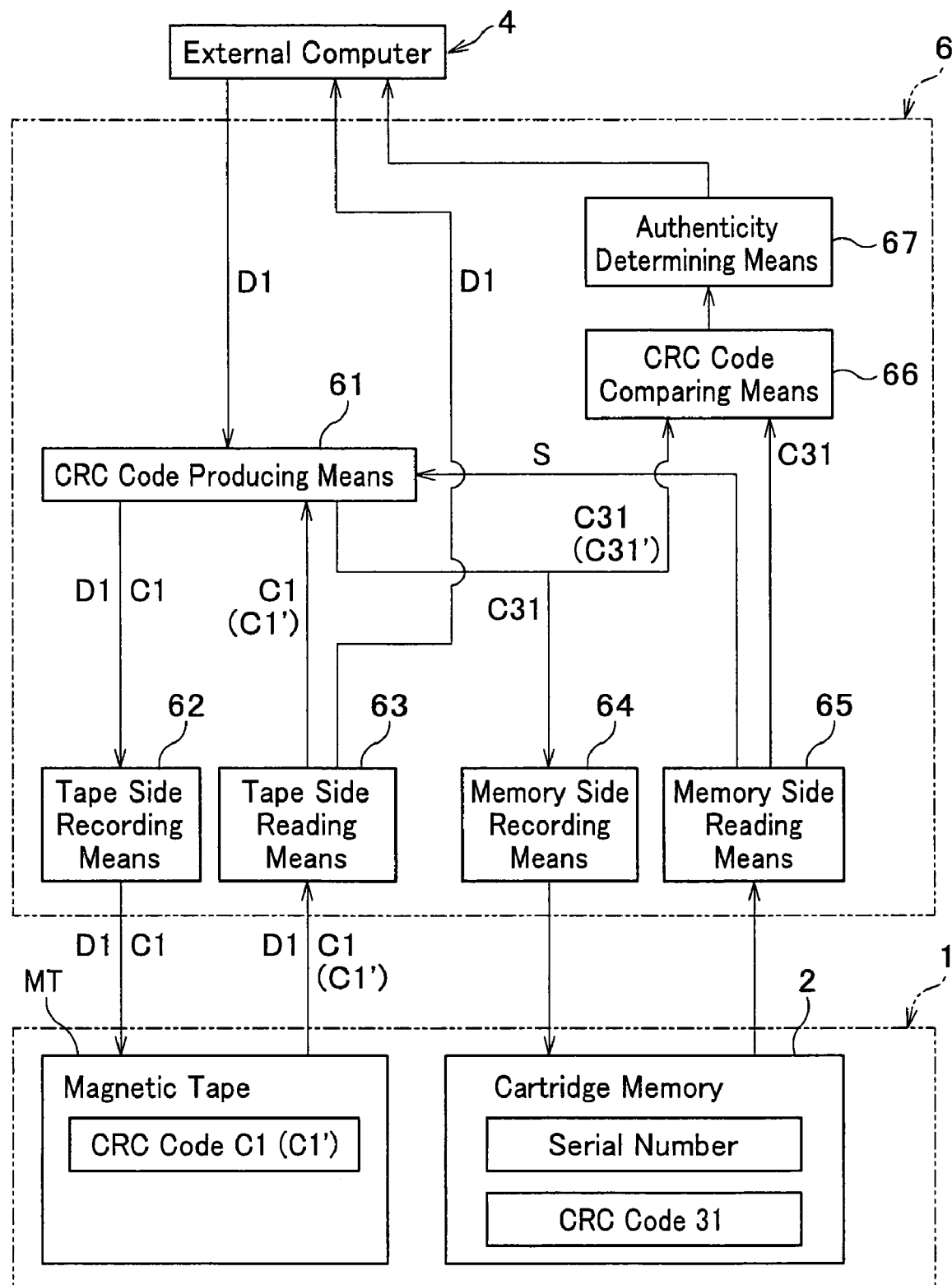
FIG. 5 is a block diagram schematically showing a magnetic tape cartridge related a third embodiment and recording/reproducing apparatus therefor.

As shown in FIG. 5, in the cartridge memory 2, a CRC code C31 produced based on a serial number S of the memory 2 and the CRC code C1 of the data D1 recorded in the magnetic tape MT is recorded in an unrewritable state. Moreover, a recording/reproducing apparatus 6 is provided with a tape side recording means 62, a memory side recording means 64, and a CRC code comparing means 66, and an authentication determining means 67 having approximately similar function to the first embodiment, and is also provided with a CRC code producing means 61, a tape side reading means 63, and a memory side reading means 65 having a little bit different function from the first embodiment.

The CRC code producing means 61 produces the code C1 from the data D1 similarly to the first embodiment and produces the code C31 for recording in the cartridge memory 2 based on the code C1 output from the tape side reading means 63 and the serial number S output from the memory side reading means 65. Moreover, in reproducing the magnetic tape cartridge 1, the CRC code producing means 61 produces the code C31 to output to the CRC code comparing means 66 based on the code C1 and serial number S. For example, if the code C1 of the data D1 is "E7 36 64 5C" and the serial number S is "44000123HEX", the CRC code C31 is produced based on "E7 36 64 5C 44 00 01 23" and its value becomes "81 EB A7 01."

The code C31 produced by the CRC code producing means 61 is designed to be output to the memory side recording means 64 in recording of the data D1 into the magnetic tape MT, and to be output to the CRC code comparing means 66 in reproducing. The tape side reading means 63 reads the data D1 of the magnetic tape MT together with the code C1, and only the code C1 of these two is output to the producing means 61. The memory side reading means 65 reads the serial number S and code C31 from the cartridge memory 2, then outputs the serial number S to the producing means 61 and the code C31 to the comparing means 66.

Then, operations of the recording/reproducing apparatus 6 are described.

Firstly, in recording, the CRC codes C1, C2, . . . , Cn of the data D1, D2, . . . , Dn, which are input from the computer 4 similarly to the first embodiment, are produced by the CRC code producing means 61, and are recorded in the magnetic tape MT by the tape side reading means 63. Then, the code C1 is read from the magnetic tape MT by the reading means 63, thereby being output to the producing means 61. On the other hand, the serial number S is read from the cartridge memory 2 by the memory side reading means 65, thereby being output to the producing means 61. In the producing means 61, the code C31 is produced based on the code C1 and serial number S, thereby being recorded in the cartridge memory 2 through the memory side recording means 64 in an unrewritable state.

In reproducing, the code C1 read by the tape side reading means 63 and the serial number S read by the memory side reading means 65 are output to the CRC code producing means 61 similarly in the recording. In the producing means 61, the code C31 is produced based on the code C1 and serial number S, thereby being output to the CRC code comparing means 66. On the other hand, the code C31 read by the reading means 65 is output to the comparing means 66. Then, the code C31 from the producing means 61 is compared with the code C31 from the cartridge memory 2 by the comparing means 66, and a determined result based on a comparison result is output to the computer 4 by the authentication determining means 67.

Here, if the data D1 is tampered, a value of the CRC code C1' becomes different from one before tampered similarly to the first embodiment. Therefore, it is confirmed that the CRC code C31' produced by the CRC code producing means 61 and the CRC code C31 from the cartridge memory 2 do not accord, thereby being able to know that the data D1 is tampered.

According to the above, similar effects can be obtained in the third embodiment as in the first embodiment and the following effects can be obtained.

The code C31 recorded in the cartridge memory 2 includes the serial number S, so by memorizing it in the recording/reproducing apparatus 6, it is possible to cope when the memory 2 is changed. For example, before comparing with the code C31 from the CRC code producing means 61 by the CRC code comparing means 66, make comparison of the code C31 memorized in the apparatus 6 with that of the cartridge memory 2 and if both do not accord, it is known that the cartridge memory 2 is changed. That is, by regarding a change of the cartridge memory 2 as tampered, the authentication of the data D1 can be verified even when the cartridge memory 2 is changed.

As described above, the invention is not limited to the embodiments and various embodiments are available.

In the embodiments, the magnetic tape MT is adopted as a recording medium. However, the invention is not limited to this and any recording medium such as a magnetic disk, optical recording tape, and optical recording disk is available.

In the embodiments, the CRC code is recorded in the cartridge memory in the recording/reproducing apparatuses. However, the invention is not limited to this and it may be recorded beforehand in other apparatuses. That is, a recording/reproducing apparatus may at least have function to compare a CRC code from a magnetic tape with that from a cartridge memory and to determine.

In the embodiments, the CRC code C1 is recorded in the magnetic tape MT. However, the invention is not limited to this and the code C1 need not be necessarily recorded in the magnetic tape MT. For example, in the first embodiment, make only the data D1, D2, . . . , Dn be recorded in the magnetic tape MT, and the code C1 is always produced from the data D1 in comparison by the CRC code producing means 31, whereby the code C1 may be designed to be output to the CRC code comparing means 36.

In the embodiments, the magnetic tape cartridge 1 is adopted as a recording medium cartridge. However, the invention is not limited to this and any cartridge may be substituted if the recording medium cartridge is provided with a cartridge memory.

In the embodiments, a number of the CRC code C1 recorded in the cartridge memory 2 is one. However, the invention is not limited to this and a CRC code C2 may be recorded in the cartridge memory 2 if authentication of the data D2 is required to be verified. That is, a plurality of CRC codes may be recorded in the cartridge memory 2.

What is claimed is:

1. A recording/reproducing apparatus for recording on/reproducing from a recording medium cartridge comprising a recording medium and a cartridge memory, wherein a first cyclic redundancy checking (CRC) code produced from data recorded in said recording medium is recorded in said cartridge memory in an unrewritable state, the recording/reproducing apparatus comprising:

a CRC code comparing means which compares a second CRC code produced from data recorded in said recording medium with a first CRC code corresponding to said data recorded in said cartridge memory, said second CRC code being produced when said data is recorded in said recording medium; and an authentication determining means which determines authentication of data recorded in said recording medium based on a comparison result of a CRC code comparing means, wherein a flag for write protection is generated after completion of said data being recorded in said recording medium and said cartridge memory is not rewritable.

2. A recording/reproducing apparatus according to claim 1:

wherein when said first CRC code and said second CRC code accord in a comparison result by said CRC code comparing means, said authentication determining means judges that recorded data in said recording medium is authentic; and wherein when said first CRC code and said second CRC code do not accord in the comparison result by said CRC code comparing means, said authentication determining means judges that the recorded data in said recording medium is not authentic.

* * * * *